United States Patent [19]

Finnegan

[11] Patent Number: 4,765,521
[45] Date of Patent: Aug. 23, 1988

[54] ANTI-THEFT CABLE LOCK

[75] Inventor: Robert J. Finnegan, Williston, Vt.

[73] Assignee: The Shelburne Corporation, Shelburne, Vt.

[21] Appl. No.: 56,808

[22] Filed: Jun. 2, 1987

[51] Int. Cl.$^4$ ............................................. B60R 9/04
[52] U.S. Cl. .................................. 224/315; 224/324; 224/329
[58] Field of Search ............... 224/309, 315, 319, 322, 224/324, 329; 70/258

[56] References Cited

U.S. PATENT DOCUMENTS

| | | | |
|---|---|---|---|
| 3,132,780 | 5/1984 | Binding | 224/315 |
| 3,931,919 | 1/1976 | Gerber et al. | 224/324 |
| 4,294,388 | 10/1981 | Wunstel | 224/322 X |
| 4,366,605 | 1/1983 | McKenney | 224/315 X |

FOREIGN PATENT DOCUMENTS

| | | | |
|---|---|---|---|
| 810807 | 1/1937 | France | 224/329 |
| 8301603 | 5/1983 | Int'l Pat. Institute | 224/329 |
| 2053113 | 2/1981 | United Kingdom | 224/322 |

*Primary Examiner*—Henry J. Recla
*Assistant Examiner*—Robert Petrik
*Attorney, Agent, or Firm*—Hopgood, Calimafde, Kalil, Blaustein & Judlowe

[57] ABSTRACT

Anti-theft cable-locked security is provided for articles mounted to a roof rack and for the roof rack itself, by providing a set or kit of two flexible-cable subassemblies, each of which has a closed-door stop block at one end of its cable, and each of which also has a headed slide which is engageable to an elongate slide-track channel formation on the underside of a roof rack. Certain commercially available roof racks already have such a slide-track slide formation, but for those not thus equipped, an additional channel element can be provided for permanent incorporation in an existing rack. A first one of the subassemblies has a relatively short length of cable, and the headed slide is adjustably clamped to the cable via a knurled nut which is manually set before assembly to the slide track of the rack; once in the slide track, further manual adjustment or tampering is foreclosed. The other subassembly has a relatively great length of cable, and a headed slide may be fixed or adjustably clamped to the cable, at predetermined offset from the involved stop block; the free end of the cable is long enough to wrap the rack-mounted article (or articles) and, if desired, also to wrap the rack bar, to the extent that the free end of the cable can be anchored to the headed slide of the first subassembly. The only necessary adjustment is for positioning the slide of the short-cable assembly, such that upon assembly to the slide track and locked closure of both doors, the article (or articles) and the rack are both anti-theft secure upon the automobile roof.

16 Claims, 1 Drawing Sheet

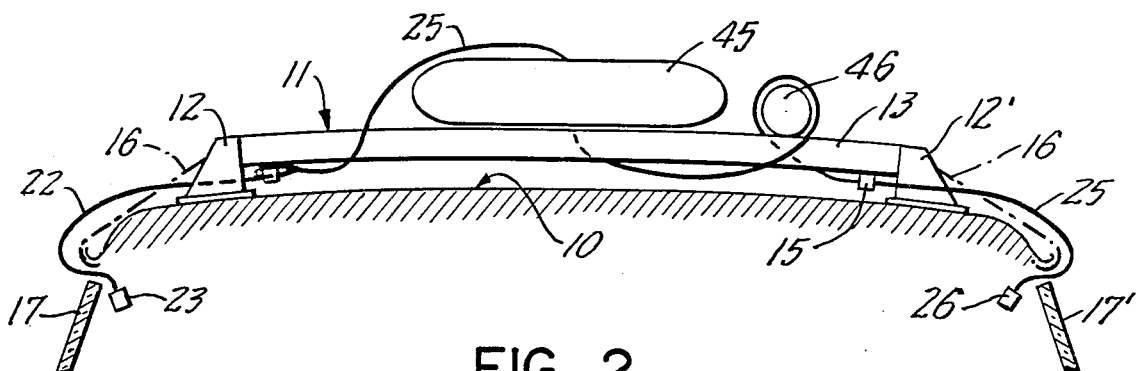
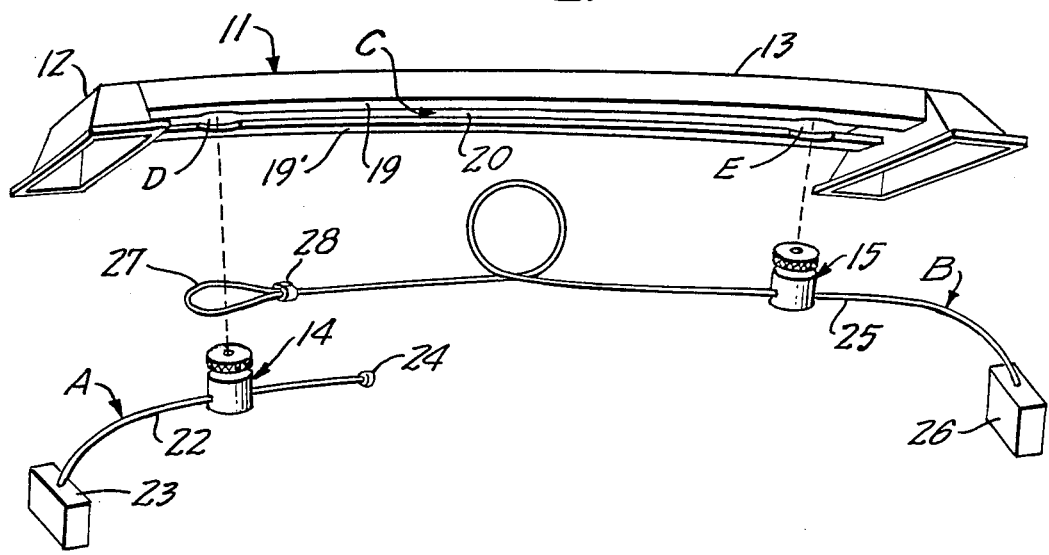
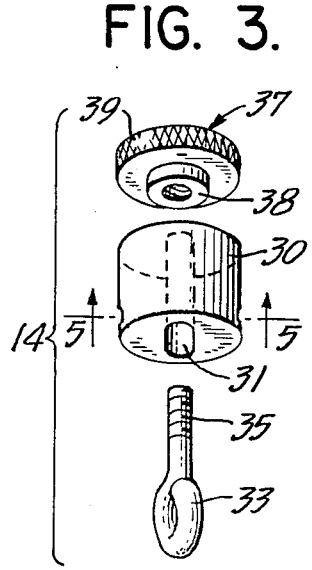
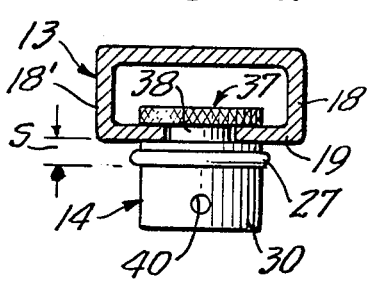
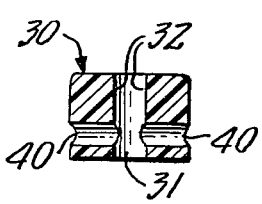
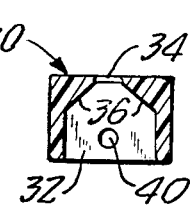
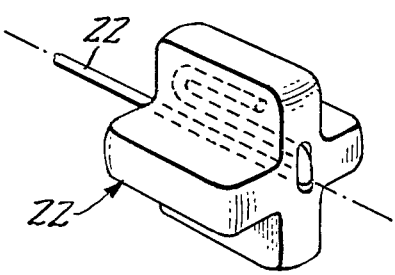

ANTI-THEFT CABLE LOCK

BACKGROUND OF THE INVENTION

The invention pertains to security devices employing flexible cable to lock one or more articles, such as skis or a sailboard in mounted position upon an automobile roof rack.

U.S. Pat. No. 3,132,780 discloses a roof-mounted rack wherein spaced legs connect the ends of a spacer bar and are engageable to rain gutters on opposite sides of an automobile, and ski-clamping wing arms are centrally hinged to the bar. At the distal end of each clamping arm is a channel-shaped latch which contains means for selectively clamping a short length of flexible cable for such offset from a fixed stop button at the cable end as to enable the cable to pass between a door and its lintel so that the stop button will be blocked when the door is closed, thus preventing unauthorized release of the latch as long as the closed door is locked. The cables thus only hold the latches in down position, and the cables have no engaged or engageable relation to articles mounted to the roof rack.

Canadian Pat. No. 1,149,348 discloses an article-securing system for a roof-rack supported article, wherein a single flexible cable extends between stop members adjustably securable near the respective ends of the cable; the adjusted length of the cable is so selected that the cable ends are retained by closed doors at both sides of the car, while at the same time tying down the supported article. A resetting of cable passage through plural bores in one of the stop members is necessary for any change in effective cable length between the two stop members. And no part of the cable assembly is specifically related to the roof rack.

BRIEF STATEMENT OF THE INVENTION

It is an object of the invention to provide improved anti-theft means employing flexible cable in conjunction with closed and locked doors (or windows) at both sides of an automobile, for the locked retention of one or more roof-rack mounted articles.

It is a specific object to meet the above object with cable-locking means having positive additional retaining connection to the roof rack itself whereby not only the mounted article or articles but also each of the respective ends of the roof rack is in locked and retained relation to the applicable nearby locked door or closed window.

Another specific object is to provide simple adjustment means in conjunction with cable-locking means meeting the above objects, wherein length adjustment is easily made without requiring a tool.

Still another specific object is to achieve the above objects with an anti-theft cable-lock kit whereby an existing commercial roof-top rack may be upgraded with the anti-theft feature.

The invention achieves these objects by providing a set or kit of two flexible-cable subassemblies, each of which has a closed-door stop block at one end of its cable, and each of which also has a headed slide which is engageable to an elongate slide-track channel formation on the underside of a roof rack. Certain commercially available roof racks already have such a slide-track slide formation, but, for those not thus equipped, an additional channel element can be provided for permanent incorporation in an existing rack. A first one of the subassemblies has a relatively short length of cable, and the headed slide is adjustably clamped to the cable via a knurled nut which is manually set before assembly to the slide track of the rack; once in the slide track, further manual adjustment or tampering is foreclosed. The other subassembly has a relatively great length of cable, and a headed slide may be fixed or adjustably clamped to the cable, at predetermined offset from the involved stop block; the free end of the cable is long enough to wrap the rack-mounted article (or articles) and, if desired, also to wrap the rack bar, to the extent that the free end of the cable can be anchored to the headed slide of the first subassembly. The only necessary adjustment is for positioning the slide of the short-cable assembly, such that upon assembly to the slide track and locked closure of both doors, the article (or articles) and the rack are both anti-theft secure upon the automobile roof.

DETAILED DESCRIPTION

The invention will be described for a preferred embodiment, in conjunction with the accompanying drawings, in which:

FIG. 1 is a front view in elevation of a car-top roof rack shown with the anti-theft cable-locking device of the invention, cabling being shown slack only for purposes of better illustrating cable closures;

FIG. 2 is a simplified exploded view in perspective, to show coacting components in use of the rack and cable-locking device of FIG. 1;

FIG. 3 is another exploded view in perspective, but on enlarged scale, to show the relation of parts of a headed-slide component of the device of FIG. 1;

FIG. 4 is a fragmentary transverse section through the slide track portion of the rack of FIG. 1, with the assembled headed-slide component of FIG. 3 in assembled relation to the track;

FIG. 5 is a longitudinal sectional view of the body component of FIG. 3, taken in the plane which includes the alignment axis 5—5 of FIG. 3;

FIG. 6 is another longitudinal sectional view of the body component of FIG. 3, but taken in the plane normal to that of FIG. 5; and FIG. 7 is a view in perspective of a cable-end stop-block component of the device of FIGS. 1 and 2.

In FIG. 1, the invention is shown in application to a car roof 10 having a conventional roof rack 11 applied thereto. The rack comprises spaced pedestals 12-12' connecting the longitudinal ends of an elongate rack bar 13 which may be of extruded aluminum, having a sectional profile which includes a downwardly open channel that serves for guidance of headed slides 14-15. Tie-down straps 16 (or the ends of a single elongate tie-down strap threaded through rack 11) will be understood to have suitably fitted outer ends, for tensed tie-down reference to car-body structure such as rain gutters; to avoid confusion in the drawing, such tie-down means is merely suggested by heavy phantom outlines 16 in FIG. 1. The rack 11 is conventionally one of a pair of racks, in spaced array along the car roof, at locations which register with corresponding car doors or with corresponding operable windows, the same being suggested at 17-17' in FIG. 1.

FIG. 2 is sufficiently exploded to reveal the invention as comprising first and second cable assemblies, respectively designated A and B, for use in conjunction with the downwardly open slide track C which extends longitudinally along the underside of the rack bar 13. In FIG. 4, the sectional profile of the underside of rack bar 13 is seen as a downwardly open channel, defining track C between spaced sidewalls 18–18', at opposing flange formations 19–19' which are in-turned toward each other to establish a relatively narrow gap 20 therebetween. Arcuate cut-outs 21 at one or more track locations D-E permit selective entry and removal of the head end of slides 14–15 into and out of slidable relation with track C.

The cable assembly A adjustably accommodates the headed slide 14 along the relatively short length of its flexible cable 22, suitably in the range 1 to 2 feet long. A door or window-blockable stop 23 is permanently secured to one end of cable 22 and a stop cap 24 may be secured to the other end of cable 22, to assure that slide 14 will always be in unit-handling relation with assembly A.

The cable assembly B similarly accommodates headed slide 15 along the relatively great length of its flexible cable 25, suitably in the range 5 to 8 feet long, which may be otherwise stated as preferably at least twice the rack span between pedestals 12–12'. A door or window-blockable stop 26 is permanently secured to on end of cable 25, and the other or free end of cable 25 is formed for selective disengageable coupling to the headed slide 14 of the short-cable assembly A; as shown, this free-end formation for cable 25 is a simple loop 27 of cable-25 material, permanently clamped to itself, at 28, thus assuring that slide 15 will always be in unit-handling relation with assembly B. It is optional whether the headed slide 15 is adjustably secured to cable 25 or is in fixed relatively short longitudinal offset from stop 26.

In FIGS. 3 to 6, the headed slide is seen to comprise three parts, namely, a cylindrical body 30 having an internal cavity 31 which is downwardly open, being defined by and between parallel side walls 32 which are spaced for keyed running clearance with the thickness dimension of an eyebolt 33 and which extend generally diametrically across the lower end of body 30. The upper end of body 30 is an effective closure of cavity 31, except for a central aperture 34 for through-passage of the threaded shank 35 of the eyebolt. In approach to the closed upper end of body 30, the diametral extent of cavity 31 reduces, being seen in FIG. 6 as convergent tapers 36 to define the upper profile of the cavity. The third part of slide 14 is a flange-headed nut 37 having an integrally formed hub 38, of diameter having running clearance in the gap 20 between track flanges 19–19'; the heading flange 39 of nut 37 is peripherally knurled for torquing finger engagement, and its diameter is such (a) to clear the cut-away slot-access opening D (or E) and (b) to lap both flanges 19–19' when guided along track C. Also, the axial extent of hub 38 establishes such offset of the heading flange 39 for the upper end of body 30 that, in the tightly clamped condition of nut 37 to bolt shank 35, a free-running clearance exists in respect of the upper and lower surfaces of flanges 19–19'.

To complete a description of the headed slide 14, diametrically aligned ports or passages 40 on an alignment 5—5 (FIG. 3) normal to the diametral orientation of cavity 31 extend through body 30 for threaded passage of the short cable 22, it being noted that in such passage cable 22 also passed through the eye of bolt 33; the axial offset S between ported openings 40 and the upper end of body 30 is seen in FIG. 4 to be more than sufficient to retain the second-cable loop 37 in trapped position between cable 22 (passing through ports 40) and the lower surface of the track flanges 19–19'. The relation of parts will be understood to be such that, with nut 37 relaxed from its securely clamped position, the three parts 33, 30, 37 are loosely retained to each other and to cable 22, the eye portion of bolt 33 being fully received in and having keyed engagement to body 30, via the parallel side walls 32 of cavity 31; on the other hand, with nut 37 tightened in its engagement to shank 35, the eye of bolt 33 locally draws cable 22 into clamped binding engagement with adjacent inner ends of port passages 40. Stated in other words, when nut 37 is firmly clamped to bolt shank 35 (via body 30), a circumferential "groove" is defined around hub 38, for slidable guided engagement by the track flanges 19–19'; the upper radial wall of this "groove" is provided by the adjacent annular shoulder face 39' of the heading flange 39, and the lower radial wall of this "groove" is defined by the adjacent upper face 30' of body 30. And it should be noted that, once thus clamped and inserted into track-guided relation, there is no permissible access to alter the clamped setting to the cable.

What has been said in description of the headed slide 14 may also apply to slide 15, except that, once a vehicle-determined optimum position has been established for slide 15 on its cable, the clamped-connected location may be regarded as fixed, i.e., not requiring readjustment.

Description of structure is completed in reference to the stop block 23 or 26, for the door or window-blocked anchor-referencing of corresponding ends of cables 22–25. Block 23 (identical to block 26) is seen in FIG. 7 as having a generally cruciform section, with the end of cable 22 internally doubled and redoubled back on itself in its fully potted and impregnated embedment in the molded plastic, e.g., ABS, of which block 23 (or 26) is formed.

In use of the invention, and with rack 11 in conventionally assembled relation to the car roof 10, the subassembly B is assembled thereto by entry of the headed end of slide 15 into guided relation with track flanges 19–19', it being assumed that the desired offset (from stop block 26) has already been determined and set for slide (15) fixation to cable 25. The stop block should be held to the car by door or window closure at 17', and the free remainder of cable 25 should be tensed to make sure that slide 15 remains clear of any access cut-away location (e.g., at E). The remaining free length of cable 25 is substantial and should be wrapped around one or more articles mounted to rack 11. FIG. 1 illustrates that such articles can include a sailboard 45 and its mast 46; thus cable 25 is shown passing from slide 15 (leftward) beneath rack bar 13, up and around mast 46, downward and forward of bar 13, beneath bar 13, upward behind bar 13 and through the centerboard slot of sailboard 45, over the surface of the sailboard, and forward in downward passage into engaged relation with slide 14 of subassembly A. It is to be understood that threading convolutions of the free end of cable 25 should be drawn snug, and with additional envelopment(s) of the rack bar 13 if necessary, all to the end that slide 14 can be engaged to loop 14 and retained snug to the adjusted position of slide 14 on cable 22, when the stop block 23 is finally trapped by door or window closure at 17. With the car locked, there is now no way to dislodge the cable-locked retention of rack 11 and/or its mounted articles 45–46, without invasive destruction of one of the component parts.

It will be seen that the described anti-theft cable lock arrangement meets all stated objects and is, in reality, extremely simple to use. Only one adjustment is required, for correct positioning of slide 14 on its cable 22, in adaptation to the particular location dictated by the tensed cable (25) location of its loop end 27. The assemblies A and B are seen as a kit bringing anti-theft assurance to an existing rack configuration. And if the existing rack does not have a slide-engageable track on its underside, the kit may be viewed as additionally including an extruded track (with sectional features 18–18' and 19–19', and at least one of the slide-entry cut-away formations D and/or E), such additional track being understood to be adapted for permanent (e.g., bolted or riveted) assembly of its closure wall (47, FIG. 4) to the underside of the existing rack bar.

Preferred materials for described parts are molded ABS for stop blocks 23–26, and for slide body 30; cadmium-plated steel for eyebolt 33 and for nut 37; and vinyl-jacketed ⅛-inch wire rope for each of the cables 22–25.

While the invention has been described in detail for a preferred embodiment, it will be understood that modification may be made without departing from the scope of the invention.

What is claimed is:

1. In combination, a car-top roof rack comprising an elongate rack channel with a pedestal connected top each of the respective end regions of said channel for supporting said channel above a car roof and with the channel having an open side in downwardly facing orientation, said rack having means at its ends for securing the same atop a car roof, said channel having a sectional profile characterized by laterally spaced sidewalls with integrally formed flanges which extend toward each other to narrow the open width of the downwardly facing side to a slot which is relatively narrow compared to the spacing of said sidewalls, and said flanges being locally cut-away at least at one location; a first length of flexible cable having a first door-engageable block at one end and a first headed slide sized to be inserted through said cut-away and presenting a groove formation for sliding engagement along the slot defined by said flanges, said first slide being selectively clamped to said first cable at an adjustably predetermined location that is offset from said first block; and a second length of flexible cable having a second door-engageable block at one end and a second headed slide similar to said first headed slide and slidably mountable in said slot via the cut-away flange location and connected to said second flexible cable at a longitudinal location that is offset from said second block, said second cable having a free end extending from said second slide to an extent substantially exceeding the longitudinal span of said rack, and said free end being removably engageable to said first slide only when said first slide is removed from said channel, said free end being non-removable from said first slide as long as said first slide is engaged to said channel; whereby when said rack is in operative position with said first and second cables passing around side doors of a vehicle and with the respective blocks locked inside the vehicle, and with said second cable connected to said first slide via passage through and/or around an object carried on said rack, the object may be thereby locked to the vehicle.

2. The combination of claim 1, wherein the length of said second cable is at least substantially twice the span of said rack.

3. The combination of claim 1, wherein said first headed slide is selectively clampable to said first cable only when said first headed slide is removed from said channel.

4. The combination of claim 1 or claim 3, wherein said second headed slide is selectively clampable to said second cable only when said second headed slide is removed from said channel.

5. The combination of claim 1 or claim 3, wherein said second headed slide is permanently fixed to said second cable at said longitudinal location that is offset from said second block.

6. The combination of claim 1, in which said cut-away location is one of two longitudinally spaced cut-away locations, each of which is at substantially the same spacing longitudinal offset from a different one of said pedestals.

7. The combination of claim 1, in which said first headed slide comprises a cylindrical body of diameter greater than the width of said slot, said body having upper and lower ends and with an internal cavity open to the lower end, said body being closed at the upper end except for a reduced central bore through the closed end, a pair of diametrically aligned cable ports through said body on an alignment through said cavity, an eye bolt having a threaded shank passing through said bore and an eye on the alignment of said ports, said first cable passing through said ports and eye, and a headed nut having a bore in threaded engagement with said shank, said nut having a reduced hub sized for guidance by and between the opposed flanges and along the slot, the outer end of said nut having an enlarged heading flange sized for entry via the cut-away portion but for guided overlap of said opposed flanges, said eye locally clamping the cable against the closed end of said body when said headed nut is tightened via said shank and to the closed end of said body, and said groove formation being established by and between said headed nut and said body when said headed nut has been tightened to the closed end of said body.

8. The combination of claim 7, in which for the cable-clamping condition of said headed slide, the heading flange is offset from the closed end of said body to an extent sufficient for running clearance of said groove with said opposed flanges.

9. The combination of claim 7, in which said cavity is characterized by a section profile that is defined by two parallel walls between which said eye has running clearance, said walls extending generally diametrically and substantially normal to the alignment of said ports, whereby said eye has keying engagement to said parallel walls.

10. The combination of claim 7, in which the free end of said second cable is a permanent loop formation and in which said ports are at such offset from the closed end of said body as to accommodate the loop of the free end of said second cable, in running clearance relation with said opposed flanges when said first headed slide is slidably engaged to said rack.

11. The combination of claim 7, in which said heading flange has a knurled periphery.

12. As an article of manufacture, a flexible-cable kit for providing anti-theft security for one or more articles carried by an automobile roof rack said kit comprising:

an elongate rack channel having an open side and means for supporting the channel above a car roof with the open side in downwardly facing orientation, said channel having a sectional profile characterized by laterally spaced side walls with integrally formed flanges which extend toward each other to narrow the open width of the downwardly facing side to a slot which is relatively narrow compared to the spacing of said side walls, and said flanges being locally cut-away at least at one location;

a first length of flexible cable having a first door-engageable block at one end and a first headed slide sized to be inserted through said cut-away and presenting a groove for sliding engagement along the slot defined by said flanges, said first slide being selectively clampable to said first cable at an adjustably predetermined location that is offset from said first block; and a second length of flexible cable having a second door-engageable block at one end and a second headed slide similar to said first headed slide and slidably mountable in said slot via the cut-away location and connected to said second flexible cable at a longitudinal location that is offset from said second block, said second cable having a free end extending from said second slide to an extent substantially exceeding the length of the rack, and said free end being removably engageable to said first slide only when said first slide is removed from guided relation to said rack, said free end being non-removable from said first slide as long as said first slide is engaged to said rack.

13. The kit of claim 12, in which the length of said first cable is in the range from one to two feet, and in which the length of said second cable is in the range from five to eight feet.

14. The kit of claim 13, in which the other end of said first flexible cable is terminated by a permanently fixed stop member, whereby to retain unit-handling relation of said first headed slide to said first cable regardless of the clamped or unclamped relation.

15. The kit of claim 13, in which the free end of said second flexible cable is terminated by a permanently fixed loop of said second cable, wherein the size of the loop is such as to enable selective assembly and disassembly of the loop around the first headed slide.

16. The kit of claim 12 wherein the means for supporting the channel above a car roof comprises means for permanently mounting said channel to the underside of a pre-existing rack bar having no slide channel accommodation for the headed slides of said kit.

* * * * *